W. STEWART.
Children's Carriages.
No. 6,553. Reissued July 20, 1875.
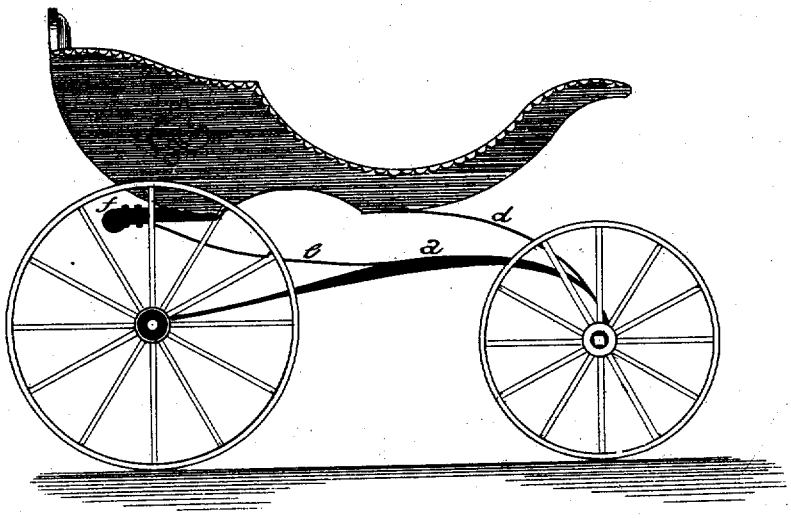
WITNESSES
John Pollitt
Edwd S Bill.
INVENTOR
William Stewart
By W. E. Simonds
Atty.
N. PETERS, PHOTO-LITHOGRAPHER, WASHINGTON, D. C.

UNITED STATES PATENT OFFICE.

WILLIAM STEWART, OF HARTFORD, CONNECTICUT.

IMPROVEMENT IN CHILDREN'S CARRIAGES.

Specification forming part of Letters Patent No. 150,984, dated May 19, 1874; reissue No. 6,553, dated July 20, 1875; application filed July 2, 1875.

*To all whom it may concern:*

Be it known that I, WILLIAM STEWART, of Hartford, in the county of Hartford and State of Connecticut, have invented a new and useful Improvement applicable to Baby Carriages and larger vehicles, of which the following is a specification, reference being had to the accompanying drawing, which is a side elevation of a carriage embodying my said improvement.

The carriage has two duplicate reaches, *a*, supported at the ends by any of the common methods. Near the front end of each reach starts a lever-spring, *d*, attached to the under side of the carriage, and to the upper side of the reach. Farther back on each reach starts another lever-spring, *e*, attached to the top of the reach, and either to the bottom of the carriage at the rear, or to an arm, *f*, projecting therefrom. The reaches *a* are commonly of wood, and are practically strong enough to be rigid; though I do not mean by that that they must be made so large as to have no spring under any circumstances.

The invention consists in the combination of the rigid reaches, the lever-springs all lying in the same line of direction, and the body of the carriage, the whole forming a cheap and simple arrangement, giving a very elastic motion to the carriage body.

I am aware that reaches and springs have been heretofore used in a great variety of arrangements and combinations for supporting carriage bodies, and therefore I make no claim to the combination of a reach, a spring, and a carriage body broadly, but only to the combination and arrangement I show and describe herein, or to a combination substantially the same, the essential features of which are, first, two reaches practically rigid; second, four lever springs running from the top of the reaches to the bottom of the carriage body—two upon each reach, two to support the front end of the body, and two to support the rear end—all lying in the same direction, the whole combined and arranged substantially as shown.

It is essential that the reaches be practically rigid, that they may not by their elasticity neutralize or counteract the elasticity of the springs superimposed upon them. It is essential that the springs be lever-springs, in distinction from reflex, elliptic, or helical, to obtain the undulating motion of the carriage body, which I desire; and, for the same purpose, it is essential that the springs all lie in the same direction.

I claim as my invention—

The combination of the rigid reaches *a*, lever-springs *d e*, lying in the same line of direction with the reaches, and the body of the carriage, all substantially as shown and described.

WILLIAM STEWART.

Witnesses:

WM. E. SIMONDS,

EDWD. S. BILL.